(12) United States Patent
Klatt et al.

(10) Patent No.: US 6,503,969 B1
(45) Date of Patent: Jan. 7, 2003

(54) FLAME-RETARDANT POLYESTER MOLDING COMPOSITIONS CONTAINING FLAME RETARDANT NITROGEN COMPOUNDS AND DIPHOSPHINATES

(75) Inventors: Martin Klatt, Mannheim (DE); Bernd Leutner, Frankenthal (DE); Michael Nam, Ludwigshafen (DE); Herbert Fisch, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/674,539

(22) PCT Filed: Apr. 26, 1999

(86) PCT No.: PCT/EP99/02873

§ 371 (c)(1), (2), (4) Date: Nov. 2, 2000

(87) PCT Pub. No.: WO99/57187

PCT Pub. Date: Nov. 11, 1999

(30) Foreign Application Priority Data

May 7, 1998 (DE) .......................................... 198 20 398

(51) Int. Cl.⁷ ............................................ C08K 5/5313
(52) U.S. Cl. ..................................... 524/133; 524/126
(58) Field of Search ................................ 524/133, 139, 524/126

(56) References Cited

U.S. PATENT DOCUMENTS

| | | | |
|---|---|---|---|
| 4,180,495 A | | 12/1979 | Sandler |
| 4,208,321 A | | 6/1980 | Sandler |
| 4,208,322 A | | 6/1980 | Sandler |
| 4,530,953 A | * | 7/1985 | Yoshida |
| 4,632,946 A | * | 12/1986 | Muench et al. |
| 5,326,805 A | | 7/1994 | Sicken |
| 5,503,790 A | * | 4/1996 | Clements |
| 5,780,534 A | | 7/1998 | Kleiner |
| 6,207,736 B1 | * | 3/2001 | Nass et al. |
| 6,270,560 B1 | * | 8/2001 | Kleiner et al. |

FOREIGN PATENT DOCUMENTS

| | | |
|---|---|---|
| DE | 196 14424 | 10/1997 |
| DE | 196 43280 | 4/1998 |
| EP | 006 568 | 1/1980 |
| EP | 584 567 | 3/1994 |
| EP | 699 708 | 3/1996 |
| WO | 98/17720 | 4/1998 |

OTHER PUBLICATIONS

JP Abst. 03/281 652.
JP Abst. 05/070 671.
JP Abst. 09/157 503.
Abst. BE 875–530.

* cited by examiner

Primary Examiner—Peter Szekely
(74) Attorney, Agent, or Firm—Keil & Weinkauf

(57) ABSTRACT

Thermoplastic molding compositions comprise
- A) from 5 to 96% by weight of a polyester,
- B) from 1 to 30% by weight of a nitrogen compound, excluding melamine cyanurate,
- C) from 0.1 to 30% by weight of a phosphinate of formula I or of a diphosphinate of formula II or of polymers of these or mixtures of these

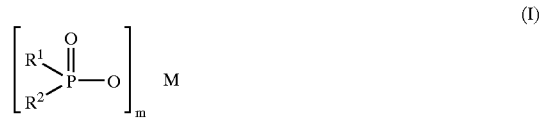

(I)

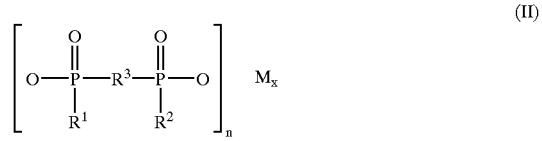

(II)

as defined in the specification
- D) from 0 to 5% by weight of at least one ester or amide of saturated or unsaturated aliphatic carboxylic acids having from 10 to 40 carbon atoms with saturated aliphatic alcohols or amines having from 2 to 40 carbon atoms, and
- E) from 0 to 60% by weight of other additives, where the total of the percentages by weight of components A) to E) is 100%.

9 Claims, No Drawings

FLAME-RETARDANT POLYESTER MOLDING COMPOSITIONS CONTAINING FLAME RETARDANT NITROGEN COMPOUNDS AND DIPHOSPHINATES

The invention relates to thermoplastic molding compositions, comprising
- A) from 5 to 96% by weight of a polyester,
- B) from 1 to 30% by weight of a nitrogen compound, excluding melamine cyanurate,
- C) from 0.1 to 30% by weight of a phosphinate of formula I or of a diphosphinate of formula II or of polymers of these or mixtures of these

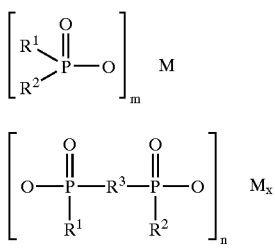

where:
- $R^1$ and $R^2$ are hydrogen, linear or branched alkyl having from 1 to 6 carbon atoms or phenyl, with the proviso that at least one of the radicals $R^1$ and $R^2$ is hydrogen,
- $R^3$ is linear or branched $C_1$- to $C_{10}$-alkylene or is arylene, alkylarylene or arylalkylene,
- M is an alkaline-earth metal or alkali metal, Al, Zn, Fe or boron,
- m is an integer from 1 to 3,
- n is an integer from 1 to 3, and
- x is 1 or 2
- D) from 0 to 5% by weight of at least one ester or amide of saturated or unsaturated aliphatic carboxylic acids having from 10 to 40 carbon atoms with saturated aliphatic alcohols or amines having from 2 to 40 carbon atoms, and
- E) from 0 to 60% by weight of other additives, where the total of the percentages by weight of components A) to E) is 100%.

The invention further relates to the use of the novel molding compositions for producing fibers, films or moldings, and also to the resultant moldings of any type.

The market is increasingly interested in halogen-free flame-retardant polyesters. Significant requirements placed upon the flame retardant are: pale intrinsic color, adequate heat stability for incorporation into thermoplastics, and also effectiveness in reinforced and unreinforced polymer (wicking effect of glass fibers).

The UL 94 fire test for unreinforced polyesters should be passed here at the V-0 level. For reinforced polyesters, at least the V-2 classification should be obtained and/or the glow-wire test passed.

Besides the halogen-containing systems there are in principle four halogen-free FR systems used in thermoplastics:
Inorganic flame retardants, which have to be used in large amounts to be effective.
Nitrogen-containing FR systems, such as melamine cyanurate, which has limited effectiveness in thermoplastics, e.g. polyamide. In reinforced polyamide it is effective only in combination with shortened glass fibers. Melamine cyanurate by itself is not effective in polyesters.
Phosphorus-containing FR systems, which are generally not very effective in polyesters.
Phosphorus/nitrogen-containing FR systems, such as ammonium polyphosphates or melamine phosphates, which do not have sufficient thermal stability for thermoplastics processed at temperatures above 200° C.

JP-A 03/281 652 has disclosed polyalkylene terephthalates which comprise melamine cyanurate and glass fibers, and also a phosphorus-containing flame retardant. These molding compositions comprise derivatives of phosphoric acid, such as phosphoric esters (valence state +5), which tend to bleed out on exposure to heat.

These disadvantages are also seen for the combination of melamine cyanurate (MC) with resorcinol bis(diphenyl phosphate), known from JP-A 05/070 671. These molding compositions also have high phenol values during processing and do not have adequate mechanical properties.

JP-A 09/157 503 has disclosed polyester molding compositions with MC, phosphorus compounds and lubricants, comprising less than 10% of reinforcing agents. Molding compositions of this type have flame-retardant and mechanical properties which are not fully satisfactory. The same applies to migration and phenol formation during processing.

EP-A 699 708, DE-A 19614424 and BE-A 875 530 have disclosed salts of phosphinic acid as flame retardants for polyesters.

WO 98/17720 has disclosed combinations of MC with phosphorus-containing compounds and lubricants for polyesters.

It is an object of the present invention to provide flame-retardant polyester molding compositions which achieve an adequate UL 94 classification and an improved LOI value. In addition there should be a very high degree of retention of mechanical properties. Thermal stability during processing should, furthermore, be improved, and phenol emission reduced.

We have found that this object is achieved by means of the thermoplastic molding compositions defined at the outset. Preferred embodiments are given in the subclaims.

The novel molding compositions comprise, as component A), from 5 to 96% by weight, preferably from 10 to 70% by weight and in particular from 10 to 60% by weight, of a thermoplastic polyester.

Use is generally made of polyesters based on aromatic dicarboxylic acids and on an aliphatic or aromatic dihydroxy compound.

A first group of preferred polyesters is that of polyalkylene terephthalates having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$–$C_4$-alkyl, such as methyl, ethyl, iso- or n-propyl or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebaccic acid, dodecandioc acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethylanol and neopentyl glycol, and mixtures of these.

Particularly preferred polyesters A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT comprising, as further monomer units, up to 1% by weight, preferably up to 0.75% by weight, of 1,6-hexanediol and/or 5-methyl-1,5-pentanediol.

The viscosity number of the polyester A) is generally in the range from 50 to 220, preferably from 80 to 160 (measured in 0.5% strength by weight solution in a phenol/o-dichlorobenzene mixture (in a weight ratio of 1:1 at 25° C.) in accordance with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyethylene terephthalate (PET) and polybutylene terephthalate (PBT). The proportion of the polyethylene terephthalate in the mixture is preferably up to 50% by weight, in particular from 10 to 30% by weight, based on 100% by weight of A).

Novel molding compositions of this type have very good flame-retardant properties and improved mechanical properties.

It is also advantageous to use recycled PET materials (also termed scrap PET) in a mixture with polyalkylene terephthalates, such as PBT.

Recycled materials are generally:
1) Those known as post-industrial recycled materials: these are production wastes during polycondensation or during processing, e.g. sprues from injection molding, start-up material from injection molding or extrusion, or edge trims from extruded sheets or films.
2) Post-consumer recycled materials: these are plastic items which are collected and treated after utilization by the end consumer. Blow-molded PET bottles for mineral water, soft drinks and juices are easily the predominant items in quantity terms.

Both types of recycled material may be used either as regrind or in the form of pellets. In the latter case, the crude recycled materials are isolated and purified and then melted and pelletized using an extruder. This usually facilitates handling and free-flowing properties, and metering for further steps in processing.

The recycled materials may either be used as pellets or as regrind. The edge length should not be more than 6 mm, preferably less than 5 mm.

Because polyesters undergo hydrolytic cleavage during processing (due to traces of moisture) it is advisable to predry the recycled material. The residual moisture content after drying is preferably from 0.01 to 0.7%, in particular from 0.2 to 0.6%.

Another class to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are made from 5 to 100 mol % of isophthalic acid and from 0 to 95 mol % of terephthalic acid, in particular from about 50 to about 80% terephthalic acid and from 20 to about 50% of isophthalic acid.

The aromatic dihydroxy compounds preferably have the formula III

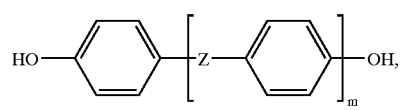

where Z is alkylene or cycloalkylene having up to 8 carbon atoms, arylene having up to 12 carbon atoms, carbonyl, sulfonyl, oxygen or sulfur or a chemical bond, and m is from 0 to 2. The phenylene groups in the compounds may also have substitution by $C_1$–$C_6$-alkyl or alkoxy and fluorine, chlorine or bromine.

Examples of parent compounds for these compounds are dihydroxydiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α, α'-di(hydroxyphenyl)dialkylbenzene,
di(hydroxyphenyl) sulfone, di(hydroxybenzoyl)benzene, resorcinol, and
hydroquinone, and also the ring-alkylated and ring-halogenated derivatives of these.

Among these, preference is given to 4,4'-dihydroxydiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to 2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone, and
2,2-di(3',5'-dimethyl-4'-hydroxyphenyl)propane, and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

For the purposes of the invention, polyesters include polycarbonates which have been obtained by polymerizing aromatic dihydroxy compounds, in particular 2,2-bis(4-hydroxyphenyl)propane (bisphenol A) and its derivatives, e.g. with phosgene. Corresponding products are known per se and are described in the literature, and many of them are also commercially available. The amount of the polycarbonates is up to 90% by weight, preferably up to 50% by weight, based on 100% by weight of component A).

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

The novel thermoplastic molding compositions comprise, as component B), from 1 to 30% by weight, preferably from 5 to 20% by weight, and in particular from 5 to 15% by weight, of a nitrogen compound as flame retardant, excluding melamine cyanurate.

Suitable nitrogen compounds (also frequently termed salts or adducts) are:

|  | CAS No. |
|---|---|
| Melamine borate | 53587-44-3 |
| Melamine oxalate (prim.) | 82124-01-4 |
| Melamine phosphate (prim.) | 20208-95-1 |
| Melamine phosphate (sec.) | 56974-60-8 |
| Melamine pyrophosphate (sec.) | 15541-60-3 |
| Polymeric melamine phosphate | 56386-64-2 |
| Melamine neopentyl glycol borate | N.A. |
| Guanidine carbonate | 593-85-1 |
| Guanidine cyanurate (prim.) | 70285-19-7 |
| Guanidine phosphate (prim.) | 5423-22-3 |
| Guanidine phosphate (sec.) | 5423-23-4 |
| Guanidine sulfate (prim.) | 646-34-4 |
| Guanidine sulfate (sec.) | 594-14-9 |
| Guanidine pentaerythritol borate | N.A. |
| Guanidine neopentyl glycol borate | N.A. |
| Urea phosphate (prim.) | 4861-19-2 |
| Urea cyanurate | 57517-11-0 |
| Ammeline | 645-92-1 |
| Ammelide | 645-93-2 |
| Melem | 1502-47-2 |
| Melon | 32518-77-7 |

Compounds for the purposes of the present invention include benzoguanamine itself and its adducts or salts, and also the nitrogen-substituted derivatives and their adducts or salts.

Other suitable compounds are ammonium polyphosphate $(NH_4PO_3)_n$, where n is from about 200 to 1000, preferably from 600 to 800, and tris(hydroxyethyl) isocyanurate (THEIC) of formula IV

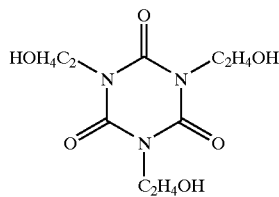

IV and its reaction products with aromatic carboxylic acids $Ar(COOH)_m$, where

Ar is a mono-, bi- or trinuclear aromatic six-membered ring system and m is 2, 3 or 4.

Examples of suitable carboxylic acids are phthalic acid, isophthalic acid, terephthalic acid, 1,3,5-benzenetricarboxylic acid, 1,2,4-benzenetricarboxylic acid, pyromellitic acid, mellophanic acid, prenitic acid, 1-naphthoic acid, 2-naphthoic acid, naphthalenedicarboxylic acids and anthracenecarboxylic acids.

They are prepared by reacting the tris(hydroxyethyl) isocyanurate with the acids, or with their alkyl esters or their halides using the process of EP-A 584 567.

Reaction products of this type are a mixture of monomeric and oligomeric esters which may also have been crosslinked. The degree of oligomerization is usually from 2 to about 100, preferably from 2 to 20. Preference is given to the use of THEIC and/or its reaction products in mixtures with phosphorus-containing nitrogen compounds, in particular $(NH_4PO_3)_n$. The mixing ratio, for example of $(NH_4PO_3)_n$ to THEIC is preferably 90–50:50–10% by weight, in particular 80–50:50–20% by weight, based on the mixture of components B) of this type.

Other suitable compounds are benzoguanamine (compounds) of formula V

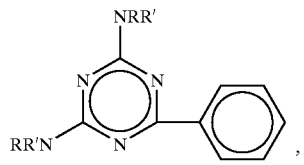

V where R and R' are straight-chain or branched alkyl having from 1 to 10 carbon atoms or preferably hydrogen, and in particular adducts of these with phosphoric acid, boric acid and/or pyrophosphoric acid.

Preference is also given to allantoin compounds of formula VI

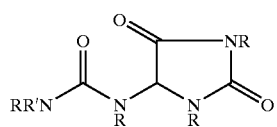

VI where R and R' are as defined in formula V, and also the salts of these with phosphoric acid, boric acid and/or pyrophosphoric acid, and also glycourils of formula VII or salts of these with the above-mentioned acids

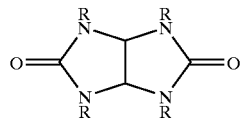

VII where R is as defined in formula V.

Suitable products are available commercially or obtainable as in DE-A 196 14 424.

The cyanoguanidine (formula VIII) which can be used according to the invention is obtained, for example, by reacting calcium cyanamide with carbonic acid, whereupon the cyanamide produced dimerizes at a pH of from 9 to 10 to give cyanoguanidine.

-continued

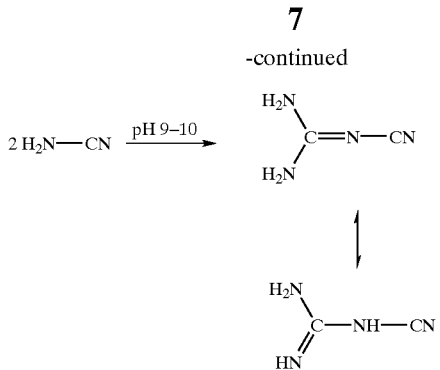

VIII

The product obtained commercially is a white powder with a melting point of from 209 to 211° C.

The novel molding compositions comprise, as component C), from 0.1 to 30% by weight, preferably from 1 to 25% by weight and in particular from 10 to 20% by weight, of a phosphinate of formula (I) and/or of a diphosphinate of formula (II) or polymers of these or mixtures of these

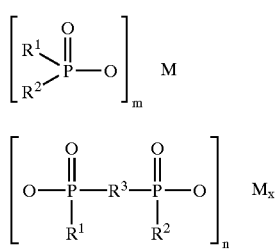

where:
- $R^1$ and $R^2$ are hydrogen, phenyl, $C_1$–$C_6$-alkyl, preferably $C_1$–$C_4$-akyl, linear or branched, e.g. methyl, ethyl, n-propyl, iso-propyl, n-butyl, tert-butyl or n-pentyl, with the proviso that at least one of the radicals $R^1$ and $R^2$ is hydrogen, in particular $R^1$ and $R^2$ are hydrogen;
- $R^3$ is $C_1$–$C_{10}$-alkylene, linear or branched, e.g. methylene, ethylene, n-propylene, iso-propylene, n-butylene, tert-butylene, n-pentylene, n-octylene or n-dodecylene; arylene, e.g. phenylene or naphthylene; alkylarylene, e.g. methylphenylene, ethylphenylene, tert-butylphenylene, methylnaphthylene, ethylnaphthylene or tert-butylnaphthylene; aralkylene, e.g. phenylmethylene, phenylethylene, phenylpropylene or phenylbutylene;
- M is an alkaline-earth metal or alkali metal, Al, Zn, Fe or boron;
- m is an integer from 1 to 3;
- n is an integer from 1 to 3; and
- x is 1 or 2.

Particular preference is given to compounds of formula II where $R_1$ and $R^2$ are hydrogen, where M is preferably Al or Zn, and very particular preference is given to calcium phosphinate.

Products of this type are available commercially, e.g. as calcium hypophosphite.

Suitable salts of formula I or II where only one of the radicals $R^1$ and $R^2$ is hydrogen are sodium benzenephosphinate and calcium benzenephosphinate.

Preparation processes are known from EP-A 699 708 and BE-A 875 530.

The novel molding compositions may comprise, as component D), from 0 to 5% by weight, preferably from 0.01 to 5% by weight, particularly preferably from 0.05 to 3% by weight and in particular from 0.1 to 2% by weight, of at least one ester or amide of saturated or unsaturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms.

The carboxylic acids may be mono- or dibasic. Examples which may be mentioned are pelargonic acid, palmitic acid, lauric acid, margaric acid, dodecanedioc acid, behenic acid and, particularly preferably stearic acid, capric acid and montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol and pentaerythritol. Glycerol and pentaerythritol are preferred.

The aliphatic amines may be mono- to tribasic. Examples of these are stearylamine, ethylenediamine, propylenediamine, hexamethylenediamine and di(6-aminohexyl)amine. Ethylenediamine and hexamethylenediamine are particularly preferred. Correspondingly, preferred esters or amides are glycerol distearate, glycerol tristearate, ethylenediamine distearate, glycerol monopalmitate, glycerol trilaurate, glycerol monobehenate and pentaerythritol tetrastearate.

It is also possible to use mixtures of different esters or amides or combinations of esters with amides. The mixing ratio may be as desired.

The novel molding compositions may comprise, as component E), from 0 to 60% by weight, in particular up to 50% by weight, of other additives.

Examples of usual additives E) are amounts of up to 40% by weight, preferably up to 30% by weight, of elastomeric polymers (also frequently termed impact modifiers, elastomers or rubbers).

These are very generally copolymers which have preferably been built up from at least two of the following monomers: ethylene, propylene, butadiene, isobutene, isoprene, chloroprene, vinyl acetate, styrene, acrylonitrile and acrylate and/or methacrylates having from 1 to 18 carbon atoms in the alcohol component.

Polymers of this type have been described, for example, in Houben-Weyl, Methoden der organischen Chemie, Vol. 14/1 (Georg-Thieme-Verlag, Stuttgart, 1961), pages 392–406, and in the monography by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene-(EPDM) rubbers.

EPM rubbers generally have practically no residual double bonds, whereas EPDM rubbers may have from 1 to 20 double bonds per 100 carbon atoms.

Examples of diene monomers for EPDM rubbers are conjugated dienes, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8- decadiene, or mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These dicarboxylic acid derivatives or monomers containing epoxy groups are preferably incorporated into the rubber by adding, to the monomer mixture, monomers containing dicarboxylic acid groups and/or containing epoxy groups and having the formulae I, II, III or IV

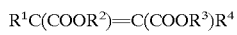 (I)

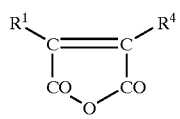 (II)

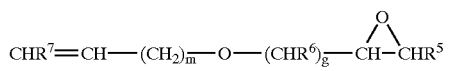 (III)

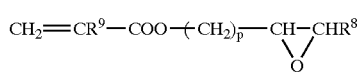 (IV)

where $R^1$ to $R^9$ are hydrogen or alkyl having from 1 to 6 carbon atoms, m is an integer from 0 to 20, g is an integer from 0 to 10 and p is an integer from 0 to 5.

$R^1$ to $R^9$ are preferably hydrogen, where is m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate. Although the latter have no free carboxyl groups their behavior approximates to that of the free acids and they are therefore termed monomers with latent carboxyl groups.

The copolymers are advantageously composed of from 50 to 98% by weight of ethylene, from 0.1 to 20% by weight of monomers containing epoxy groups and/or of methacrylic acid and/or monomers containing anhydride groups, the remaining amount being (meth)acrylates.

Particular preference is given to copolymers made from
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by a Blackley in the monograph "emulsion polymerization". The emulsifiers and catalysts which may be used are known per se.

In principle it is possible to use homogeneously structured elastomers, or those with a shell construction. The shell-type structure is a result of the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, and corresponding methacrylates, and butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

In the elastomers, the soft or rubber phase (with a glass transition temperature below 0° C.) may be the core, the outer enveloping shell or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally prepared by polymerizing, as principle monomers, styrene, acrylonitrile, methacrylonitrile, α-methylstyrene, p-methylstyrene, or acrylates or metharylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxyl, latent carboxyl, amino and amide groups, and also functional groups which may be introduced by concomitant use of monomers of the formula

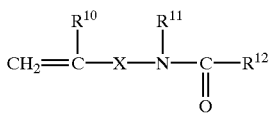

where:
$R^{10}$ is hydrogen or $C_1$–$C_4$-alkyl,
$R^{11}$ is hydrogen, $C_1$–$C_8$-alkyl or aryl, in particular phenyl,
$R^{12}$ is hydrogen, $C_1$–$C_{10}$-alkyl, $C_6$–$C_{12}$-aryl or —$OR^{13}$,
$R^{13}$ is $C_1$–$C_8$-alkyl or $C_6$–$C_{12}$-aryl, if desired with substitution by O— or N-containing groups,
X is a chemical bond or $C_1$–$C_{10}$-alkylene or $C_6$–$C_{12}$-arylene, or

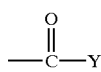

Y is O—Z or NH—Z, and
Z is $C_1$–$C_{10}$-alkylene or $C_6$–$C_{12}$-arylene.

The graft monomers described in EP-A 208 187 are also suitable for introducing reactive groups at the surface.

Other examples are acrylamide, methacrylamide and substituted acrylates or methacrylates, such as (N-tert-butylamino)ethylmethacrylate, (N, N-dimethylamino) ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain portion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl methacrylate, diallyl maleate, diallyl fumarate and diallyl itaconate, and the corresponding monoallyl compounds of these dicarboxylic acids. Besides these, there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention is made firstly of graft polymers with a core and at least one outer shell and the following structure:

| Type | Monomers for the core | Monomers for the enveloping shell |
|---|---|---|
| I | 1,3-Butadiene, isoprene, n-butyl acrylate, ethylhexyl acrylate or mixtures of these | Styrene, acrylonitrile, methyl methacrylate |
| II | As I but with concomitant use of crosslinking agents | As I |
| III | As I or II | n-Butyl acrylate, ethyl acrylate, methyl acrylate, 1,3-butadiene, isoprene, ethylhexyl acrylate |
| IV | As I or II | As I or III, but with concomitant use of monomers having reactive groups, as described herein |
| V | Styrene, acrylonitrile, methyl methacrylate or mixtures of these | First shell made from monomers as described under I and II for the core, and second shell as described under I or IV for the shell |

These graft polymers, in particular amounts of up to 40% by weight of ABS and/or ASA polymers, are used in particular for the impact-modification of PBT, if desired in a mixture with up to 40% by weight of polyethylene terephthalate. Corresponding blend products are commercially available under the tradename Ultradur®S (previously Ultrablend®S) from BASF AG. ABS/ASA mixtures with polycarbonates are commercially obtainable with the trademark Terblend® (from BASF AG).

Instead of graft polymers whose structure has more than one shell it is also possible to use homogeneous, i.e. single-shell, elastomers made from 1,3-butadiene, isoprene and n-butyl acrylate or from copolymers of these. These products, too, may be prepared via concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer shell made from the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubbers listed above.

Fibrous or particulate fillers which may be mentioned are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular from 1 to 40% by weight, particularly from 20 to 35% by weight.

Examples of preferred fibrous fillers are carbon fibers, aramid fibers and potassium titanate fibers, and particular preference is given to glass fibers in the form of E glass. These may be used as rovings or in the commercially available forms of chopped glass.

The fibrous fillers may have been surface-precoated with a silane compound to improve compatibility with the thermoplastic.

Suitable silane compounds have the formula:

$$(X-(CH_2)_n)_k-Si-(O-C_mH_{2m+1})_{4-k}$$

where:

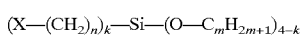

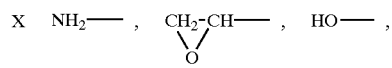

n is an integer from 2 to 10, preferably of 3 or 4, m is an integer from 1 to 5, preferably 1 or 2, and k is an integer from 1 to 3, preferably 1.

Preferred silane compounds are aminopropyltrimethoxysilane, aminobutyltrimethoxysilane, aminopropyltriethoxysilane, and aminobutyltriethoxysilane, and also the corresponding silanes which contain a glycidyl group as substituent X.

The silane compounds are generally used for surface-coating in amounts of from 0.05 to 5% by weight, preferably from 0.5 to 1.5% by weight and in particular from 0.8 to 1% by weight (based on D)).

Acicular mineral fillers are also suitable.

For the purposes of the present invention, acicular mineral fillers are mineral fillers with pronounced acicular character.

An example is acicular wollastonite. The mineral preferably has an L/D (length to diameter) ratio of from 8:1 to 35:1, preferably from 8:1 to 11:1. The mineral filler may, if desired, have been pretreated with the abovemetioned silane compounds, but the pretreatment is not essential.

Other fillers which may be mentioned are kaolin, calcined kaolin, wollastonite, talc and chalk.

The novel thermoplastic molding compositions may comprise, as component E), conventional processing aids, such as stabilizers, oxidation inhibitors, agents to prevent decomposition by heat or by ultraviolet light, lubricants, mold-release agents, colorants, such as dyes and pigments, nucleating agents, plasticizers, etc.

Examples of oxidation inhibitors and heat stabilizers are sterically hindered phenols and/or phosphites, hydroquinones, aromatic secondary amines, such as diphenylamines, various substituted representatives of these groups, and mixtures of these in concentrations of up to 1% by weight, based on the weight of the thermoplastic molding compositions.

UV stabilizers which may be mentioned and are usually used in amounts of up to 2% by weight, based on the molding composition, are various substituted resorcinols, salicylates, benzotriazoles and benzophenones.

Colorants which may be added are inorganic pigments, such as titanium dioxide, ultramarine blue, iron oxide and carbon black, and also organic pigments, such as phthalocyanines, quinacridones and perylenes, and also dyes, such as nigrosine and anthraquinones.

Nucleating agents which may be used are sodium phenylphosphinate, alumina, silica and preferably talc.

Lubricants and mold-release agents which differ from D) and are usually used in amounts of up to 1% by weight are preferably long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), and also low-molecular-weight polyethylene waxes and low-molecular-weight polypropylene waxes.

Examples of plasticizers which may be used are dioctyl phthalates, dibenzyl phthalates, butyl benzyl phthalates, hydrocarbon oils and N-(n-butyl)benzenesulfonamide.

The novel molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pp. 484–494 and by Wall in "Fluoropolymers" (Wiley Interscience, 1972).

These fluorine-containing ethylene polymers have homogeneous distribution in the molding compositions and preferably have a particles size $d_{50}$ (number average) in the range from 0.05 to 10 μm, in particular from 0.1 to 5 μm. These small particle sizes may particularly preferably be achieved by the use of aqueous dispersions of fluorine-containing ethylene polymers and the incorporation of these into a polyester melt.

The novel thermoplastic molding compositions may be prepared by methods known per se, by mixing the starting components in conventional mixing apparatuses, such as screw extruders, Brabender mixers or Banbury mixers, and then extruding them. The extrudate may be cooled and comminuted. It is also possible to premix individual components and then to add the remaining starting materials individually and/or likewise in a mixture. The mixing temperatures are generally from 230 to 290° C.

In a preferred method, components B) to D), and also, if desired, conventional additives E), are mixed with a polyester prepolymer, compounded and pelletized. The resultant pellets are then condensed to the desired viscosity in the solid phase under an inert gas, continuously or batchwise, at a temperature below the melting point of component A).

The novel thermoplastic molding compositions have good mechanical and flame-retardant properties and also improved LOI values. Their processing takes place with very little change in the polymer matrix, and mold deposits are markedly reduced. They are suitable for producing fibers, films or moldings, in particular for applications in the electrical and electronics sectors. Particular applications are lamp parts, such as lamp sockets and lamp holders, plugs and multipoint connectors, coil formers, casings for capacitors or connectors, and circuit-breakers, relay housings and reflectors.

EXAMPLES

Component A): polybutylene terephthalate with a viscosity number of 130 ml/g and a carboxyl end group content of 34 mval/kg (Ultradur® B 4500 from BASF AG) (VN measured in a 0.5% by strength by weight solution in a 1:1 mixture of phenol and o-dichlorobenzene at 25° C., in accordance with ISO 1628).

Components B:

B/1 comp melamine cyanurate

B/1 polymeric melamine phosphate (CAS No. 56386-64-2)

B/2 oligomeric terephthalate of tris(2-hydroxyethyl) isocyanurate as in Example 3 of EP-A 584 567.

Components C:

C/1 calcium phosphinate

C/1 comp $Al(CH_3C_2H_5PO_2)_3$ (as in EP-A 584 567)

Component D:

Pentaerythritol tetrastearate (Loxiol® VPG 861 from Henkel KGaA)

Component E: chopped glass fiber of thickness 10 μm (epoxisilanized size).

Components A) to E) were blended in a twin-screw extruder at from 250 to 260° C., and extruded into a water bath. Pelletization and drying were followed by injection-molding and testing of test specimens.

The UL 94 fire test was carried out on 1/16-inch test specimens with the usual conditioning.

The LOI value was determined in accordance with ISO 4589-1984.

The makeup of the molding compositions and the results of the tests are given in the table.

TABLE

| | Example | | | | | | | | | | |
|---|---|---|---|---|---|---|---|---|---|---|---|
| | 1 comp | 2 comp[a] | 3 | 4 comp[b] | 5 comp[c] | 6 | 7 comp[b] | 8 | 9 comp[b] | 10 comp | 11 comp |
| Component A [% by weight] | 49.7 | 49.7 | 49.7 | 49.7 | 49.7 | 49.7 | 49.7 | 49.7 | 49.7 | 84.7 | 84.7 |
| Component B [% by weight] | — | — | 5 B/2 | 5 B/2 | 10 B/1 comp | 10 B/1 | 10 B/1 | 10 B/2 | 10 B/2 | — | — |
| Component C [% by weight] | 20 C/1 | 20 C/1 comp | 15 C/1 | 15 C/1 comp | 10 C/1 | 10 C/1 | 10 C/1 V | 10 C/1 | 10 C/1 comp | 15 C/1 | 15 C/1 comp |
| Component D [% by weight] | 0.3 | 0.3 | 0.3 | 0.3 | 0.3 | 0.3 | 0.3 | 0.3 | 0.3 | 0.3 | 0.3 |
| Component E [% by weight] | 30 | 30 | 30 | 30 | 30 | 30 | 30 | 30 | 30 | — | — |
| UL 94 [1.6 mm] | V-0 | V-0 | V-0 | V-0 | V-1 | V-0 | V-0 | V-0 | V-1 | V-0 | V-0 |
| LOI [%] | 32 | 28 | 35 | 29 | 28 | 36 | 29 | 34 | 27 | 33 | 28 | comp = for comparison
[a] Comparison as in EP-A 699 708
[b] Comparison as in DE-A 19 614 424
[c] Comparison as in WO 97/05705

We claim:

1. A thermoplastic molding composition, comprising
A) from 5 to 95% by weight of a polyester,
B) from 1 to 30% by weight of a flame retardant nitrogen compound, excluding melamine cyanurate,
C) from 0.1 to 30% by weight of a phosphinate of formula I or of a diphosphinate of formula II or of polymers of these or mixtures of these

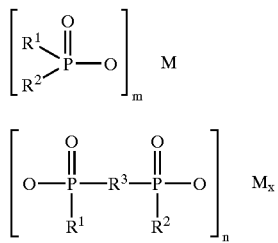

where
$R^1$ and $R^2$ are hydrogen, linear or branched alkyl having from 1 to 6 carbon atoms or phenyl, with the proviso that at least one of the radicals $R^1$ and $R^2$ is hydrogen,
$R^3$ is linear or branched $C_1$- to $C_{10}$-alkylene or is arylene, alkylarylene or arylkalkylene,
M is an alkaline-earth metal or alkali metal, Al, Zn, Fe or boron,
m is an integer from 1 to 3,
n is an integer from 1 to 3, and
x is 1 or 2,
D) from 0 to 5% by weight of at least one ester or amide of saturated or unsaturated aliphatic carboxylic acids having from 10 to 40 carbon atoms with saturated aliphatic alcohols or amines having from 2 to 40 carbon atoms, and
E) from 0 to 60% by weight of other additives selected from the group consisting of fillers, heat stabilizers, oxidation inhibitors, UV stabilizers, colorants, nucleating agents, lubricating and mold-release agents and fluorine containing ethylene polymers and copolymers,
where the total of the percentages by weight of components A) to E) is 100%.

2. A thermoplastic molding composition as claimed in claim 1, in which M in formula I or II is zinc, aluminum or calcium.

3. A thermoplastic molding composition as claimed in claim 1, in which component B) is calcium phosphinate.

4. A thermoplastic molding composition as claimed in claim 1, comprising from 1 to 40% by weight of a fibrous filler as component E).

5. A thermoplastic molding composition as claimed in claim 1, in which component D) is pentaerythritol tetrastearate.

6. A thermoplastic molding composition as claimed in claim 1, in which component A) is composed of a mixture of polyethylene terephthalate and polybutylene terephthalate.

7. A thermoplastic molding composition as claimed in claim 6, in which the proportion of the polyethylene terephthalate in the mixture is from 10 to 30% by weight.

8. A thermoplastic molding composition as claimed in claim 6, in which the polyethylene terephthalate is composed of a recycled material with a residual moisture content of from 0.01 to 0.7%.

9. A molding obtainable from a thermoplastic molding composition as claimed in claim 1.

* * * * *

UNITED STATES PATENT AND TRADEMARK OFFICE
CERTIFICATE OF CORRECTION

PATENT NO. : 6,503,969 B1 Page 1 of 1
DATED : January 7, 2003
INVENTOR(S) : Klatt et al.

It is certified that error appears in the above-identified patent and that said Letters Patent is hereby corrected as shown below:

<u>Title page,</u>
Item [22], the PCT filed date "Apr. 26, 1999" should be -- Apr. 28, 1999 --.

Signed and Sealed this

Twenty-second Day of April, 2003

JAMES E. ROGAN
*Director of the United States Patent and Trademark Office*